United States Patent [19]
Laird et al.

[11] Patent Number: 5,659,779
[45] Date of Patent: Aug. 19, 1997

[54] SYSTEM FOR ASSIGNING COMPUTER RESOURCES TO CONTROL MULTIPLE COMPUTER DIRECTED DEVICES

[75] Inventors: Robin T. Laird; Gary A. Gilbreath; Hobart R. Everett, all of San Diego, Calif.

[73] Assignee: The United States of America as represented by the Secretary of the Navy, Washington, D.C.

[21] Appl. No.: 233,141

[22] Filed: Apr. 25, 1994

[51] Int. Cl.$^6$ .................................................. G06F 15/00
[52] U.S. Cl. .................. 395/200.56; 395/651; 395/80; 395/81; 395/82; 395/83; 395/90
[58] Field of Search ........................ 395/800, 650, 395/200, 200.01, 80, 81, 82, 83, 90, 820; 364/424.02

[56] References Cited

U.S. PATENT DOCUMENTS

| | | | |
|---|---|---|---|
| 5,366,896 | 11/1994 | Margrey et al. | 436/48 |
| 5,416,906 | 5/1995 | Mariani | 395/200.17 |

OTHER PUBLICATIONS

Bostel et al., "Neural and Heuristic . . . for AGV's", IEEE Sep. 1993, pp. 30–35.
Johnson et al., "World Model . . . Vehicles", IEE 1991, pp. 2/1 to 2/4.
Meng et al., "Planning . . . Environments", IEE 1992, pp. 310–315.
Coyle et al., "Packet Radio . . . Future", IEEE 1989, pp. 208–209.
Kung et al., "Neural Network . . . Applications", IEEE Transactions on Robitics and Automation vol. 5, No. 5, Oct. 1989, pp. 641–657.
Ahmed et al., "An Efficient . . . Neural Networks", IEEE 1993, pp. 848–850.

*Primary Examiner*—Alyssa H. Bowler
*Assistant Examiner*—John T. Follansbee
*Attorney, Agent, or Firm*—Harvey Fendelman; Peter A. Lipovsky; Michael A. Kagan

[57] ABSTRACT

A system for controlling multiple computer directed devices, comprises: a supervisor computer which receives input data serving as operand inputs to a set of logical operators implemented in the supervisor, where the logical operators provide output results; assignable resources, including an m number of planner computers, where m is a positive integer, and an operator station computer; a link server computer; a local area network operably coupled to provide data communications among the supervisor computer, planner computers, operator station computer, and link server computer; and a p number of the devices communicatively linked to the link server computer; wherein the supervisor computer assigns a subset of the assignable resources to direct the operation of at least one of the devices in accordance with the output results.

14 Claims, 17 Drawing Sheets

SUPERVISOR

SYSTEM FOR ASSIGNING COMPUTER RESOURCES TO CONTROL MULTIPLE COMPUTER DIRECTED DEVICES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of autonomous vehicles, and more particularly to a system for controlling multiple autonomous vehicles from a single host station.

A wide variety of techniques have been developed to effectuate navigation of autonomous guided vehicles. Such techniques may be grouped into three general categories: (1) guidepath following; (2) unrestricted path planning; and (3) virtual path navigation.

The simplest form of navigational control of an autonomous guided vehicle is referred to as guidepath following which involves a navigational control loop which reflexively reacts to the sensed position of some external guiding reference. In industry, autonomous guided vehicles have been guided by physical paths including slots, buried wires, optical stripes, and other methods for almost thirty years. Such automated guided vehicles have found extensive use in factories and warehouses for material transfer, in modern office scenarios for material and mail pickup and delivery, and in hospitals for delivery of meals and supplies to nursing stations.

The most common guidepath following schemes in use today involve some type of stripe or wire guidepath permanently installed on the floor of an operating area. Specialized sensors on the front of an autonomous guided vehicle are used to servo-control the steering mechanism, causing the vehicle to follow a route defined by the guidepath. Guidepath schemes can be divided into three general categories: (1) those which sense and follow the AF or RF field from a closed-loop wire embedded in the floor; (2) those which sense and follow a magnetic tape in or on the floor; and (3) those which optically sense and follow some type of stripe affixed to the floor surface.

Implementations of the stripe following method include the most simplistic case of tracking a high contrast (dark-on-light, light-on-dark) line. More advanced optical systems have been developed which track a special reflective tape illuminated by a near-infrared source, and a chemical stripe which glows when irradiated by ultraviolet energy.

Advantages of guidepath control are seen primarily in the improved efficiency and reduction of manpower which arise from the fact that an operator is no longer required to guide the vehicle. Large numbers of autonomous guided vehicles can operate simultaneously in a plant or warehouse without getting lost or disoriented, scheduled and controlled by a central computer which monitors overall system operation vehicle flow. Communication with individual vehicles may be effectuated using radio frequency links or directional near-infrared modulated light beams, or by other means.

The fundamental disadvantages of guidepath control are the cost of path installation and maintenance, and the lack of flexibility in the system. A vehicle cannot be commanded to go to a new location unless the guidepath is first modified. This is a significant disadvantage when changes to product flow lines and assembly plants or, in the case of a security robot which must investigate a potential break-in at a designated remote location, that is not on the guidepath.

Another type of navigational control system for autonomous guided vehicles is one that uses unrestricted path planning. In this type of system a free-roaming vehicle may be directed anywhere subject to nominal considerations of terrain topography. Many potential applications await an autonomous guided vehicle that could move in a purposeful fashion without following a set guidepath, with the intelligence to avoid objects and if necessary choose alternative routes of its own planning. Most of the path planning to date has been done on the premise that the ultimate navigation system would be capable of mapping out its environment with sensors and then planning routes accordingly. While such systems have a great deal of appeal, they encounter several significant difficulties in practice.

The most significant problem associated with building a world model to support a navigation system employing unrestricted path planning is the poor quality of most sensor data. There are many choices available to the designer of such a navigation system but in every case good data is expensive. In practice, reflective sensors such as ultrasonic range finders and near-infrared proximity detectors have predominated. However, all reflective sensors are subject to the problems of noise, specular and secondary reflections and signal absorption to one extent or another.

Of all the data provided from a sensor system at a given location, only a small percentage is true, pertinent, and accurate. Furthermore, the position of objects viewed from different positions will be distorted by any errors in the vehicle's dead reckoning accuracy as it moves between vantage points. Template matching of sensor data can thus be very difficult. Finally, there are areas that appear clear to sensors which may in fact may be dangerous or impassible for other reasons. Such impasses place additional data editing responsibilities on the vehicle's programmer.

Specialized sensors must be coupled with some type of world modeling capability in order to provide a model vehicle with sufficient awareness of its surroundings to support intelligent movement in unstructured environments. "World modeling" is a well known phrase in the art which refers to numerically representing an operating environment. The model represents a two-dimensional mapping of the absolute locations of surrounding objects, and is refined in a continuous fashion as the vehicle moves about its work space. The accuracy of this model is directly dependent upon the validity of the vehicle's own perceived location and orientation. Accumulated dead reckoning errors soon render the data entered into the model invalid and that the associated geographical reference point for data acquired relative to the vehicle's position is incorrect.

As the accuracy of the model degrades, the ability of the vehicle to successfully navigate and avoid collisions diminishes rapidly, until it fails altogether. A robust navigational scheme that preserves the validity of the world model for free-roaming vehicles employing unrestricted path planning navigation systems has remained an elusive research goal and for this reason many proposed applications of truly autonomous vehicles are as yet to be implemented.

Providing an autonomous capability to support non-unrestricted motion, therefore, involves the implementation of an appropriate map representation, the acquisition of data regarding ranges and bearings to nearby objects, and the subsequent interpretation of that data in building and maintaining the world model.

Several different map representation schemes have been devised to construct a world model, including polyhedra objects, generalized cones, certainty grids, and quadrees. The simplest scheme is a two-dimensional array of cells used to define an environment. Each cell corresponds to a square of fixed size in the region being mapped. The map can be accessed and updated quickly, which is extremely important for real-time operation. Free space is indicated with a cell value of zero; a non-zero cell value indicates an object. The most compact form of a cell map consists of one bit per cell, and thus indicates only the presence or absence of an object. By using multiple bits per cell, additional descriptive data can be represented in the map such as identification of structural walls and doorways. In addition, the probability of a given square being occupied can be easily encoded, which turns the map into a form of a certainty grid. This statistical approach is especially useful when the precise location of object is unknown.

One type of unrestricted path planning navigational system uses a search algorithm that begins by "expanding" the initial cell corresponding to the robot's current position in the floor map (i.e., each unoccupied neighbor cell is added to the "expansion list."). Each cell on the expansion list is expanded. The cell expansion process continues until the destination cell is placed on the expansion list, or the list becomes empty, in which case no path exists. This algorithm will find the minimum distance path from the initial position of the vehicle to the destination.

However, the minimal distance path is not necessarily the best path. Sometimes it is more desirable to minimize the number of turns of the vehicle to reach its destination, or to maximize the distance from certain obstacles. A cell expansion search type strategy can be altered accordingly by assigning a cost to each cell prior to adding it to the expansion list. Only the minimum cost cells are then expanded. This is known in the literature as an A* search which is noted to have inherent flexibility associated with the cost function.

Another type of navigational system for autonomous vehicles employs a virtual path concept developed by Cybermotion, Inc. of Roanoke, Va. to provide a routine mechanism for correcting dead reckoning errors and a normal course of path execution. Each desired route, or path is preprogrammed by a technician to take advantage of any available environmental queues that the robot can recognize with its sensors. An environmental queue may be a wall, floor stripe, support column, or other feature at a particular location in the environment having coordinates which may be used as a benchmark, or reference for navigational purposes. Each path begins and ends on named virtual node. A database is constructed that associates each virtual note with one or more virtual path segments entering or leaving that location. Several discrete path segments may be linked together to form a complete virtual path from any given node to any other node.

Correction of dead reckoning errors accumulated as the vehicle executes a path is commonly accomplished by indicating in the virtual path program one or both of the following queues: the distance to walls on the left or right side of the robot and the expected stand-off of the wall in front of the robot at the completion of the route segment.

In the wall-following mode, the autonomous vehicle of the type described in U.S. Pat. No. 5,111,401, entitled "Navigational Control System for an Autonomous Vehicle", uses its lateral sonars to maintain a specified offset from the detected wall while traversing the distance between two given points. Knowing the starting and ending locations of the virtual path segment enables the robot to correct its heading as well as a lateral access position coordinate. When approaching a wall, the autonomous vehicle uses forward sonars to measure its actual distance from the wall. By comparing the observed range with anticipated distance specified in the program, and knowing the X-Y coordinate of where the vehicle should be when it stops, the autonomous vehicle can correct the longitudinal coordinate of its dead reckoned position. When wall following and wall approach are used on the same path segment, both the X and Y coordinates can be corrected, as well as the heading of the vehicle.

Although the virtual path approach does not provide the flexibility of unrestricted path planning, the virtual path approach may be implemented with relatively low cost sensor and computing hardware. Moreover, the virtual path approach is more adaptable than guidepath following alone. Many practical applications can be addressed with this method, but it suffers from a fundamental deficiency in the lack of collision avoidance capability. If an obstacle blocks a virtual path route segment, the autonomous vehicle must halt and wait for further directions.

In order to overcome the deficiencies in the aforementioned navigational systems, a hybrid navigational control system for an autonomous vehicle was developed, as is described in U.S. Pat. No. 5,111,401, entitled "Navigational Control System for an Autonomous Vehicle". The navigational system described in the '401 patent employs a hybrid navigational scheme which exploits the inherent re-referencing ability of the virtual path system, while retaining the free roaming flexibility of unrestricted path planning control. Under normal conditions an autonomous vehicle of the type identified above generally navigates using the hybrid navigational scheme traverses virtual paths which are kept relatively obstacle-free. Such traversal may be made at significantly higher speeds than are typically possible for autonomous vehicles navigating using the conventional unrestricted path system. In the event of an impending collision between the vehicle and some other object, the vehicle is halted and an avoidance maneuver around the obstacle is planned and implemented so that the vehicle may proceed to the desired virtual point of destination. Another type of hybrid navigational control system for an autonomous vehicle which is commercially available is known as the Cybermotion Virtual Path Navigation Scheme, which is generally provided with the Model K2A or K3A NAVMASTER autonomous guided vehicle platform by Cybermotion, Inc. There are many applications for autonomous vehicles, such as in providing security for large warehouses or in military installations, in which one vehicle is not able to provide sufficient security, whereas multiple autonomous vehicles roaming throughout such environments would. However, the problems of control and coordination of multiple autonomously guided vehicles are significant. For example, such a control system must be able to simultaneously direct multiple autonomously guided vehicles along individual paths in the operating environment while directing other vehicles around obstacles. Further, such system should also have the capability of allowing direct human supervisory control of an autonomous vehicle for situations where a particular vehicle becomes blocked in its path or inoperable. Resources for determining virtual, unrestricted, and obstacle avoidance paths, and for providing direct human supervisory control of an autonomous vehicle should be allocated on an as needed basis in order to minimize the equipment required to implement such a system. Therefore, there is a need for a system that can control the operation of multiple autonomous vehicles operating within an environment that addresses the above-referenced needs.

The control systems described in the '401 patent and used in conjunction with the Cybermotion NAVMASTER K2A or K3A autonomous vehicle platforms requires one dedicated computer for each deployed autonomous guided vehicle. In such a system, referred to as a "dedicated" system", each computer provides path planning and obstacle avoidance capabilities, as well as an operator station for direct teleoperated control of a vehicle by a human operator, such as described in U.S. Pat. No. 5,307,271, "Reflexive Teleoperated Control System For A Remotely Controlled Vehicle." For example, if it is desired to deploy ten autonomous guided vehicles, a dedicated system requires that there be ten computer/operator stations. However, a human operator is generally only capable of controlling one autonomous vehicle at a time. Therefore, dedicated system in which situations requiring simultaneous real-time human intervention for multiple vehicles would tend to overwhelm a human operator with information overload. For example, if a guard is currently teleoperating a vehicle 19, he may be unaware that one of the other vehicles 19 has detected an intruder because he is unable to see the display for that computer from his current location. In addition, having a computer monitor and user interface dedicated to each vehicle 19 requires a significant amount of desk space, which is usually at a premium in typical control rooms. Because dedicated systems are inherently unwieldy and complicated, there is a need for a more manageable system for controlling multiple autonomous vehicles.

In the '401 and Cybermotion systems, path planning and obstacle avoidance solutions are typically downloaded from a host computer (general purpose digital data processor) to a local processor on board the autonomous guided vehicle. The local processor then directs control of the vehicle. However, the generation of such solutions typically requires very little processing time by the host computer. Therefore, dedicated systems tend to be resource inefficient, and hence expensive, in terms of idle host computer time. A more efficient solution for the control of multiple autonomous vehicles would allow multiple autonomous vehicles to share host computer and operator station resources. Therefore, there is a further need for a more efficient system for controlling multiple autonomous vehicles which allocates system resources on an "as needed" basis.

SUMMARY OF THE INVENTION

A system for controlling multiple computer directed devices, comprises: a supervisor computer which receives input data serving as operand inputs to a set of logical operators implemented in the supervisor, where the logical operators provide output results; assignable resources, including an m number of planner computers, where m is a positive integer, and an operator station computer; a link server computer; a local area network operably coupled to provide data communications among the supervisor computer, planner computers, operator station computer, and link server computer; and a p number of the devices communicatively linked to the link server computer; wherein the supervisor computer assigns a subset of the assignable resources to direct the operation of at least one of the devices in accordance with the output results. The system is capable of assigning resources, where p>m, so that resources may be assigned to control the devices on an "as-needed" basis. An important advantage of the present invention is that it provides a system for controlling the operation of multiple computer directed devices such as autonomous vehicles operating within an environment with a minimum number of resources.

Another advantage of the present invention is that it provides a more manageable system for effectuating control of multiple computer directed devices under the supervision of a single human operator.

Still a further advantage of the present invention is that it provides more efficient control of multiple computer directed devices on an "as needed" basis.

Figure 1:
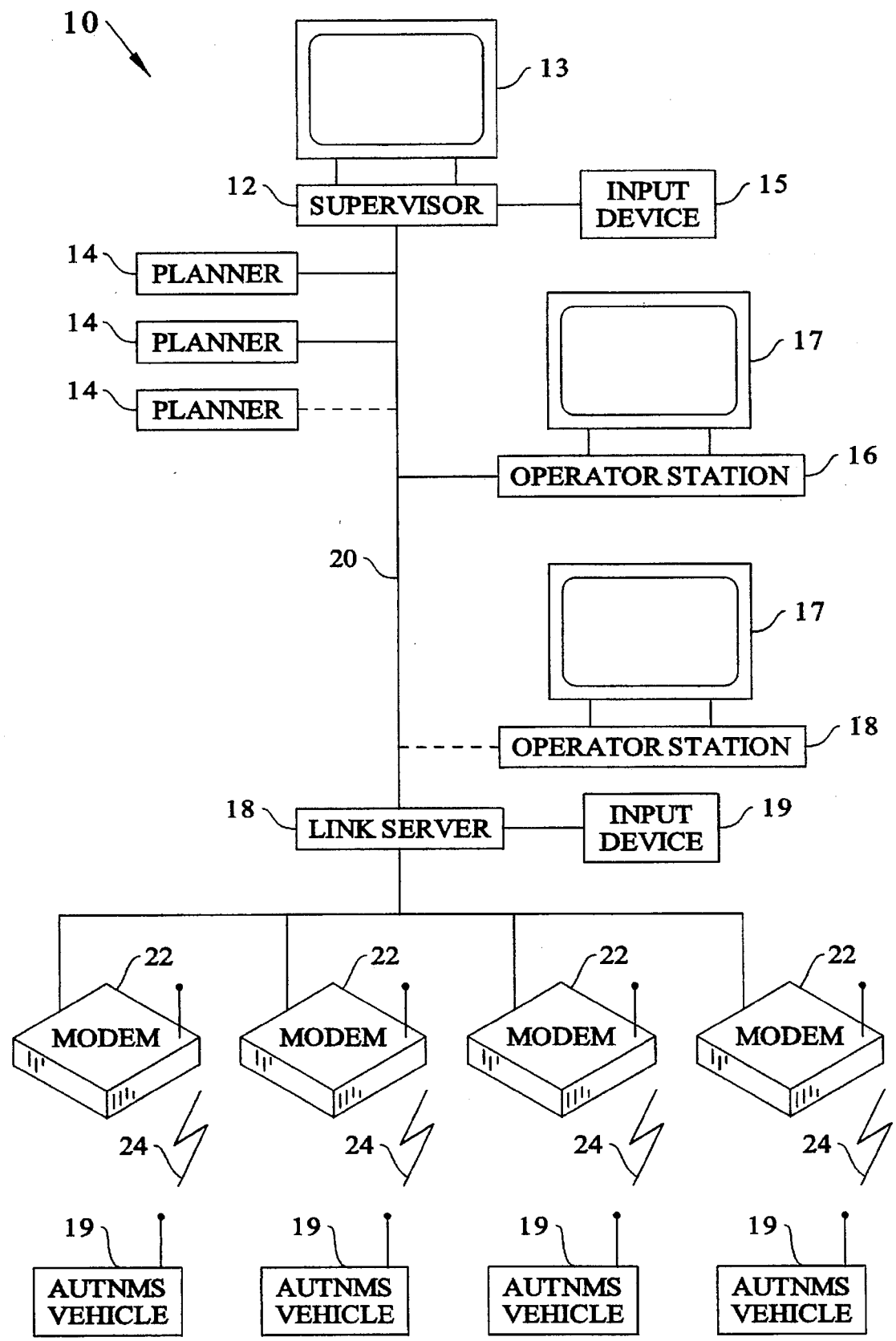
FIG. 1 is a block diagram showing a system for controlling multiple autonomously guided vehicles which embody the various features of the present invention.

The above and other aspects, features and advantages of the present invention will be more apparent from the following more particular description thereof, presented in conjunction with following drawings wherein:

DESCRIPTION OF THE PREFERRED EMBODIMENT

The following description is of the best mode presently contemplated for carrying out the invention. This description is not to be taken in a limiting sense, but is made merely for the purpose of describing the general principles of the invention. The scope of the invention should be determined with reference to the claims. Throughout the several figures, like components are referenced using like reference numerals throughout the figures.

A high level block diagram of a system 10 for controlling multiple computer directed devices from a single host station embodying various features of the present invention is presented in FIG. 1. The computer directed devices may be implemented as robots such as autonomous guided vehicles, but may also include other types of computer driven devices such as plotters printers, modems, numerically controlled machines, automated manufacturing equipment, and the like. Hereinafter, by way of example only in the context of describing and illustrating the invention, the term "robot" refers to an autonomous guided robot such as described in either of the following patents incorporated herein by reference: 1) U.S. Pat. No. 5,111,401, "Navigational Control System For An Autonomous Robot;" and 2) U.S. Pat. No. 5,307,271, "Reflexive Teleoperated Control System For A Remotely Controlled Robot." Other suitable robots more preferably include the Model K2A or K3A NAVMASTER by Cybermotion, Inc. of Roanoke, Va. The heart of the system 10 is a general purpose digital data processor, or computer referred to as the "supervisor" 12 which schedules and coordinates the actions of the various planner/dispatchers (hereinafter "planners") 14, operator station computers (hereinafter "operators") 16 and a link server computer (hereinafter "link server") 18, collectively referred to as "resources", in order to coordinate and direct the operation of one or more robots 19. High level flow charts illustrating the operation of the supervisor 12 are provided in FIGS. 5–15. A robot appropriate for use in conjunction with the present invention has the capability of autonomously traversing a path to a predetermined X-Y coordinate of a floor or deck which is modeled by Cartesian coordinates. By way of example, the planners 14, operators 16, and link server 18, are preferably implemented as general purpose digital data processors, such as DOS based personal computers. Such resources are communicatively interfaced to the supervisor 12 by a common high-speed local area network (LAN) 20. The supervisor may be operatively coupled to a video monitor 13 which displays various information about the system 10. The primary purpose of the link server 18 is to provide a communications gateway among the supervisor 12, planners 14, and operators 16 on the LAN 20 and the remote robots 19. The link server 18 preferably communicates with the robots 19 via full duplex spread spectrum RF modems 22 operating on non-interfering channels. Thus, the various resources of the system 10, i.e. the supervisor 12, planners 14 and operator stations 16, on the local area network 20 communicate with one another as needed in real-time with their assigned remote robots 19. The LAN 20 may be implemented using standard Ethernet or ARCNET hardware configured in a bus topology.

Software listings detailing the steps implemented in the supervisor 12, planner 14, operator 16, and link server 18, and in the flowcharts of FIGS. 2–11, 12A, 12B, 13, 14A, 14B, and 15 are provided, by way of example, in APPENDICES 1–4, incorporated herein by reference.

The operators 16 may be employed to allow human directed control of the robots 19 through standard input devices such as a mouse, keyboard, or joystick (not shown). A video display 17 is preferably interfaced with the operator for displaying information about the system 10. The operators 16 may be assigned to a particular planner 14 by the supervisor 12 when detailed human supervision, as for example, by a security guard, is desired to direct the operation of one or more robots 19.

A numerical representation of the environment in which the robots 19 operate, also referred to as a "world model", is maintained in each planner 14. The world model enables the planners 14 to provide the robots 19 with a real-time collision avoidance and hybrid navigational control capabilities such as described in U.S. Pat. No. 5,111,401, "Hybrid Navigational System", incorporated herein by reference. Another type of suitable "world model" is that available with the Cybermotion Model K2A or K3A NAV-MASTER.

The primary purpose of the supervisor 12 is to assign system 10 resources in order to provide a real-time response to "events"0 faced by the robots 19. "Events" are conditions with which the robots 19 are confronted that require, by way of example, either a planner 14, or both a planner 14 and an operator 16 to deal with a problem associated with an event. The term "assign" with respect to a planner 14 refers to the dedication of a planner to a particular robot 19 whereupon the planner may by way of example: 1) determine a random patrol path which the robot is to follow; 2) determine a path by which the robot avoids a known obstacle; or 3) determine a path by which the robot avoids a previously unknown obstacle, and then download such determination via the network 20 and through the data link 18 to a local processor, of the type described in U.S. Pat. No. 5,111,401, entitled "Navigational Control System for an Autonomous Vehicle", on board a particular robot 19. Such path may be a path around an obstacle or a path to a particular destination. After determination of an appropriate path, the planner 14 downloads the path information via the link server 18 to a particular robot 19. The term "assign" with respect to an operator 16 refers to the dedication of an operator to a particular robot 19 whereupon that specific robot may be teleoperated by direct human intervention via the operator 16, as for example, in accordance with the teachings of U.S. Pat. No. 5,307,271, "Reflexive Teleoperated Control System For A Remotely Controlled Robot," incorporated herein by reference.

Events may be of two types: 1) assignable events, for which the supervisor 12 automatically allocates resources of the system 10, and 2) non-assignable events for which the supervisor 12 cannot automatically assign resources. Typical assignable events include: 1) an intrusion alarm; 2) lost robot 19; 3) failed diagnostic; 4) a low battery on-board a robot 19; and 5) a robot 19 which goes offline. By way of example, resources may be assigned in accordance with the rules presented in TABLE 1, below:

TABLE 1

| Event | Assignment |
| --- | --- |
| Intrusion Alarm | Planner and Operator |
| Lost Robot | Planner and Operator |
| Failed Diagnostic | Planner and Operator |
| Low Battery | Planner |
| Robot Offline | None |

Rules for assigning resources on the LAN 20 are implemented in the supervisor 12. The rules comprise a set of logical instructions, i.e., logical operators, which operate on data inputs representing "events" which correspond to operands. The outputs of the rules are appropriate assignments of resources by the supervisor 12. Such data inputs are provided to the supervisor 12 through the LAN 20 or input device 15, shown in FIG. 1. The specific set of rules presented above are provided by way of example only in order to illustrate an example of one implementation of the present invention. It is to be understood that any combination of LAN resources may be assigned in response to the supervisor 12 receiving an input which may represent some condition of interest for which assignment of LAN resources is desired. Moreover, the rules may be tailored to suit the requirements of a particular application and are not limited to use in conjunction with security systems or autonomous guided vehicles.

Typical non-assignable events include human operator initiated 1) teleoperation of the robot 19, or 2) an emergency halt of a robot 19. Teleoperation of a robot 19 may be implemented preferably as described in U.S. Pat. No. 5,307, 271, "Reflexive Teleoperated Control System For A Remotely Controlled robot, incorporated above herein by reference.

All events are prioritized. Assignable events are assigned the highest priorities, whereas non-assignable events are given lower priorities. Multiple events of the same priority are further prioritized in chronological order of occurrence. In response to an assignable event, the supervisor 12 determines which resources are available and then assigns appropriate available resources in accordance with a set of rules implemented in the supervisor 12, described further herein, to address events based on the order of priority assigned to the events. The types of events with which the robots 19 or other resources of the system 10 may be confronted are designated as having certain defined "priorities". Such priorities are defined by a human and are summarized in an "assignable event priority" table which is implemented in software that runs in the supervisor 12. The "assignable event priority" table numerically represents the priority designated for each type of event. The supervisor then monitors the LAN 20 for data representing events. As the supervisor 12 is apprised of events through a data input such as a mouse or keyboard 15, as shown in FIG. 1., or through the LAN 20, the supervisor schedules the order in which the supervisor assigns resources to deal with a series of particular events. Examples of the priorities assigned to specific events are provided in TABLE 2, provided below by way of example only to illustrate how priorities may be assigned to specific events:

TABLE 2

| Priority | Event | Resource |
|---|---|---|
| 0 | Manual Assignment Request | Supervisor |
| 1 | Intrusion Alarm | Robot |
| 2 | Barrier Tag Atarm | Robot |
| 3 | Robot Lost | Robot |
| 4 | New Object Encountered | Planner |
| 5 | Failed Robot Diagnostic | Various |
| 6 | Low Battery | Robot |
| 7 | Robot Trapped | Planner |
| 8 | Robot Path Blocked | Robot |
| 9 | Platform Idle | Robot |
| 10 | Emergency Halt Recover | Robot |

As shown in TABLE 2, an intrusion alarm generated by a robot 19 is given a priority value of "1". A trapped robot 19 is given a priority value of "7". For example, if input data received by the supervisor 12 indicates that a robot 19 is trapped (the first event), and then subsequently received input data indicates that a robot 19 has generated an intrusion alert (the second event), the supervisor 12 responds to the events in order of priority. The first event having the lower priority of "7" is dealt with after the second event having a priority of "1" is dealt with. Dealing with an event means that the supervisor assigns resources for those events which are assignable. By way of further example, assume the supervisor is first apprised that a robot has a low battery (an event having a priority of "6"), and is then notified that a robot is idle (an event having a priority of "9"). The supervisor 12 deals with the events in order of their priorities. In such case, the supervisor first assigns resources to address the "low battery" event, and then assigns resources to deal with the "robot idle" event.

Resources may also be assigned in accordance with the following rules:

If a robot 19 is blocked by a previously undetected obstacle, a planner 14 and an operator 16 are assigned to the robot to provide a human an opportunity to evaluate and remedy the situation.

If a robot 19 is temporarily blocked by a previously detected object, a planner 14 is assigned to the robot.

If the unrestricted path planning algorithm which may be of the type described in the '401 patent is unable to avoid the blocking object, then an operator 16 is assigned to the task as well.

If a robot 19 becomes lost, an operator 16 and planner 14 are assigned to that robot.

If a potential intrusion has been detected by a robot 19, then both a planner 14 and an operator 16 are assigned to the robot.

If a diagnostic fails on board a robot 19, a planner 14 and operator 16 are assigned to the robot so that a human may intervene to deal with the situation.

If an operator 16 is already assigned, but a planner 14 is available, the lower priority events that only require a planner will be assigned to the available resource ahead of the queued events that require both a planner and an operator.

Planners 14 assigned to an event without an operator are automatically returned to an "available" status upon successful completion of the response action, without any human intervention. "Available" status refers to a resource that is available for being assigned to address an event. If the assigned action cannot be successfully completed, the supervisor 12 is notified and an operator 16 is assigned to the robot 19.

It is to be noted that there preferably should be at least one more planner 14 in the system 10 than there are operators to ensure queued events requiring the attention of a human will not interfere with the continued execution of routine random patrols of the other robots 19. In other words, if there an m number of operators 16 interfaced on the LAN 20, than there should preferably be (m+1) planners 14 on the LAN, where m is a positive integer.

Resource assignment by the supervisor 12 is accomplished on the basis of single point-to-point message communication across the local area network 20 in order to avoid race conditions, and possible priority conflicts. Thus, when the supervisor 12 assigns an operator 16 and/or a planner 14 to address some event, the supervisor will provide an "ASSIGN OPERATOR" message with the planner identification as part of the data packet for this message. Each assigned operator 16 initiates a dialogue with an assigned planner 14. Similarly, when the operator 16 has relinquished control of the robot 19 back to the supervisor 12, the operator forwards planner completion data, including status fields, as a component of a completion message to the supervisor. A status field indicates: 1) whether the planner 14 was successful in planning a path; 2) whether the planner failed to plan a path; 3) whether the planner is still planning a path; 4) whether there was a diagnostic failure of the robot; or 5) whether there is a problem with the link server. The status field is used by the supervisor 12 to generate or clear events. The supervisor 12 also assigns resources in accordance with the following rules:

In the event that no planner 14, but an operator 16 is available, the operator is assigned. When a planner 14 becomes available, the supervisor 12 assigns the available planner to the operator and robot.

In the event that some lengthy paths are initiated by an operator 16 which relinquishes control of a planner, even though a robot 19 and the planner are still working together, the supervisor 12 tracks and processes a planner completion message arriving after the operator has completed its task. This means that while the planner is still working on a path (either planning a path, downloading a path to the robot, or planning a path which avoids an obstacle) the operator 16 returns control of the robot to the supervisor 12 in response to the supervisor receiving a data signal corresponding to an event from either an operator 16 or robot 19 for which the supervisor assigns a higher priority. An example of a higher priority event is an intrusion alarm.

In the event of a failure of a planner 14, link server 18, or robot 19, a "resource failure" message is indicated on the supervisor video monitor 13. If the error is with a robot, a guard inputs directions via a standard input device 15 such as a keyboard or mouse through the supervisor 12 that directs that robot to be placed offline. If the problem is with a planner, the planner is no longer assigned. If the problem is with a link server 18, all the robots attached to that link server are placed in an offline state.

If in response to receiving a data signal corresponding to an intrusion within the environment which was generated by a robot, the supervisor 12 indicates an intruder has been detected on the monitor 13. The supervisor 12 also sends a text message to the operator 16 indicating that an alarm condition has occurred. An intrusion alert signal may be generated by a robot as set forth in U.S. Pat. No. 5,111,401, entitled "Navigational Control System for an Autonomous Vehicle," U.S. Pat. No. 4,857,912, entitled "An Intelligent Security Assessment System," and U.S. patent application Ser. No. 08/127,934, entitled "Temporal Sensor Data Fusion Scheme For Intelligent Security Assessment," filed 28 Sep., 1993, all incorporated herein by reference.

The condition of the battery on board a robot 19 is reported by the robot to the supervisor. When the battery voltage falls below an absolute minimum threshold, the supervisor 12 will direct the robot to a recharger station as soon as the robot 19 reports an idle status, i.e., the robot has completed its last assigned path. The condition of the battery on board the robot is detected and reported in accordance with the teachings of U.S. Pat. No. 5,045,769, "Intelligent Battery Charging System", incorporated herein by reference. The robot may be directed to the battery station in accordance with the teachings of the '401 patent, or by the commercially available navigation system employed in conjunction with the Cybermotion NAVMASTER Model K2A or K3A autonomous vehicle.

If a robot 19 is blocked in its directed path, the robot reports a blocked path condition to the supervisor 12. The supervisor 12 then automatically assigns a planner 14 which attempts to determine a path for the robot 19 to circumvent the blockage. If an apparently unobstructed path is determined, the planner 14 directs the robot 19 along the newly determined path.

If a robot 19 reports a failed diagnostic, that is a malfunction in some system on board the robot, the diagnostic is reported to the supervisor 12. The supervisor 12 then assigns a planner 14 and operator 16 to the robot 19, thereby disposing the robot under the control of a human operator.

A robot 19 is lost when the actual navigational parameters provided by a planner 14 to the robot differ enough from the perceived navigational parameters maintained on board the robot to where the robot can no longer successfully execute virtual paths generated by the planner. A "robot lost" condition most likely results from an accumulation of dead-reckoning errors, as described in the '401 patent.

An emergency abort is initiated when the guard depresses the system emergency halt switch 19, shown in FIG. 1, presumably in response to a serious condition, such an out of control robot. The link server halts all the robots and the supervisor creates an emergency abort event for each robot. The robots are then each assigned to the operator to allow the guard to deal with the situation of each robot.

Figure 2:
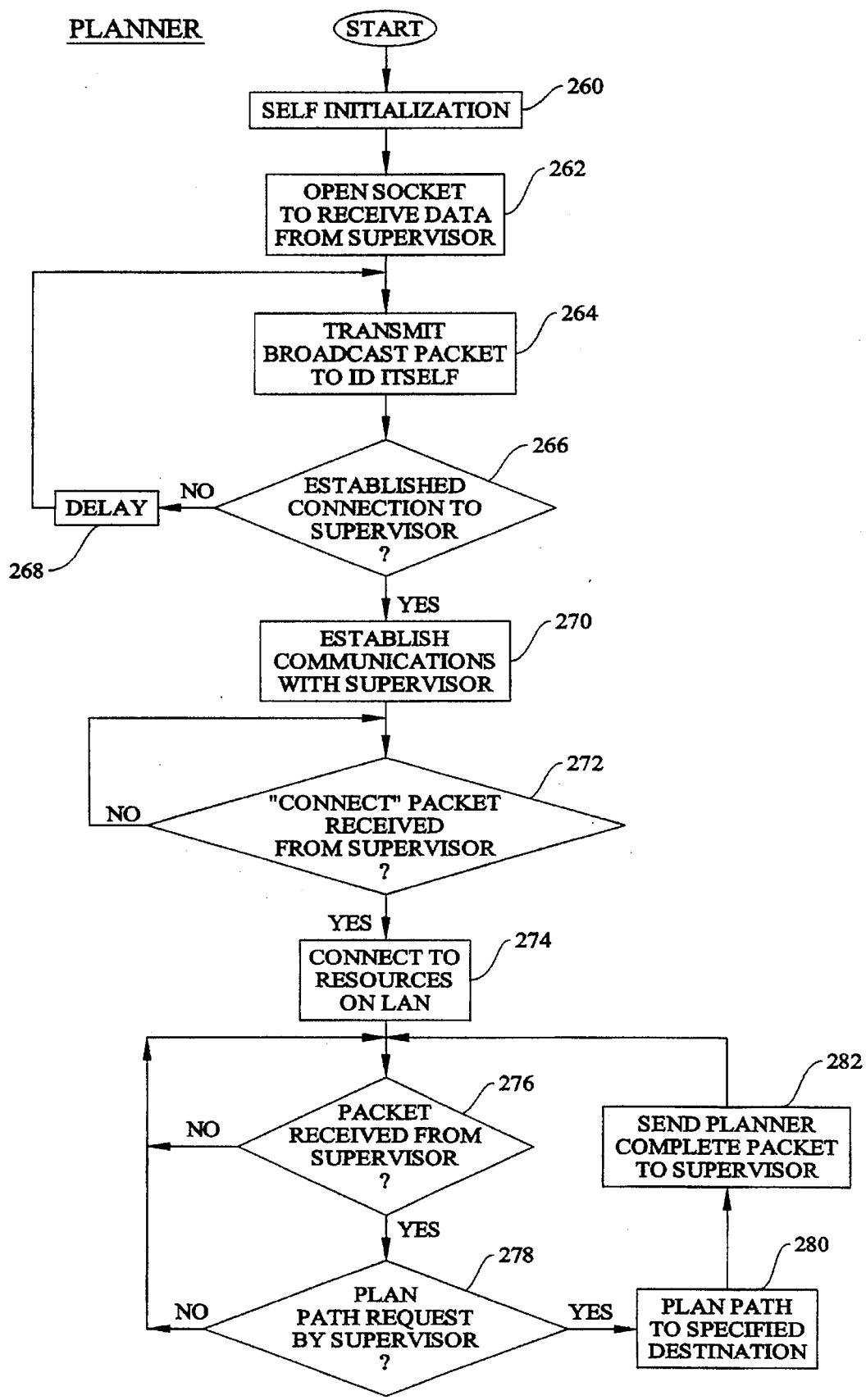
FIG. 2 is a flowchart showing the operation of the planner of FIG. 1.

The operation of any of the planners 14 is described with reference to the flowchart presented in FIG. 2. Starting at step 260, the planner 14 goes through a self-initialization step. At step 262, the planner opens a socket to receive data from the supervisor 12. The planner 14 transmits a broadcast data packet to identify itself over the network 20 at step 264 that includes a number that is unique to a specific planner 14. Proceeding to step 266, the planner 14 determines whether a data connection has been established with the supervisor 12. If the determination at step 266 is NO, a time delay is implemented at step 268, whereupon operation of the planner 14 returns to step 264. However, if the determination at step 266 is YES, the planner 14 establishes communication with the supervisor 12 at step 270. Next, the planner 14 determines whether a "connect data packet" has been received from the supervisor 12 at step 272. If the determination at step 272 is NO, the planner 14 repeats the determination at step 272 until a "connect data" packet has been received by the planner 14. If a "connect data" packet has been received from the supervisor 12, the planner 14 connects to the various resources on the local area network at step 274.

The planner 14 then determines if a data packet has been received from the supervisor 12 at step 276. If no data packet has been received from the supervisor 12, i.e., a logical NO, the operation of the planner continuously loops back to step 276. Once the planner 14 has received a data packet from the supervisor, then at step 278 the planner determines if the data packet includes a "plan path" request. If the determination at step 278 is NO, the operation of the planner returns to step 276. If, however, the determination at step 278 is YES, the planner 14 plans a path to a specified destination having an X-Y coordinate in the operating environment of the robots 19. The path may be planned in accordance with well known techniques such as those described in the '401 patent or by use of the path planning system commercially available with the Model K2A or K3A NAVMASTER by Cybermotion, Inc. After completing the path planning, the planner 14 sends the planned path to the supervisor 12. The operation of the planner 14 then returns to step 276.

Figure 3:
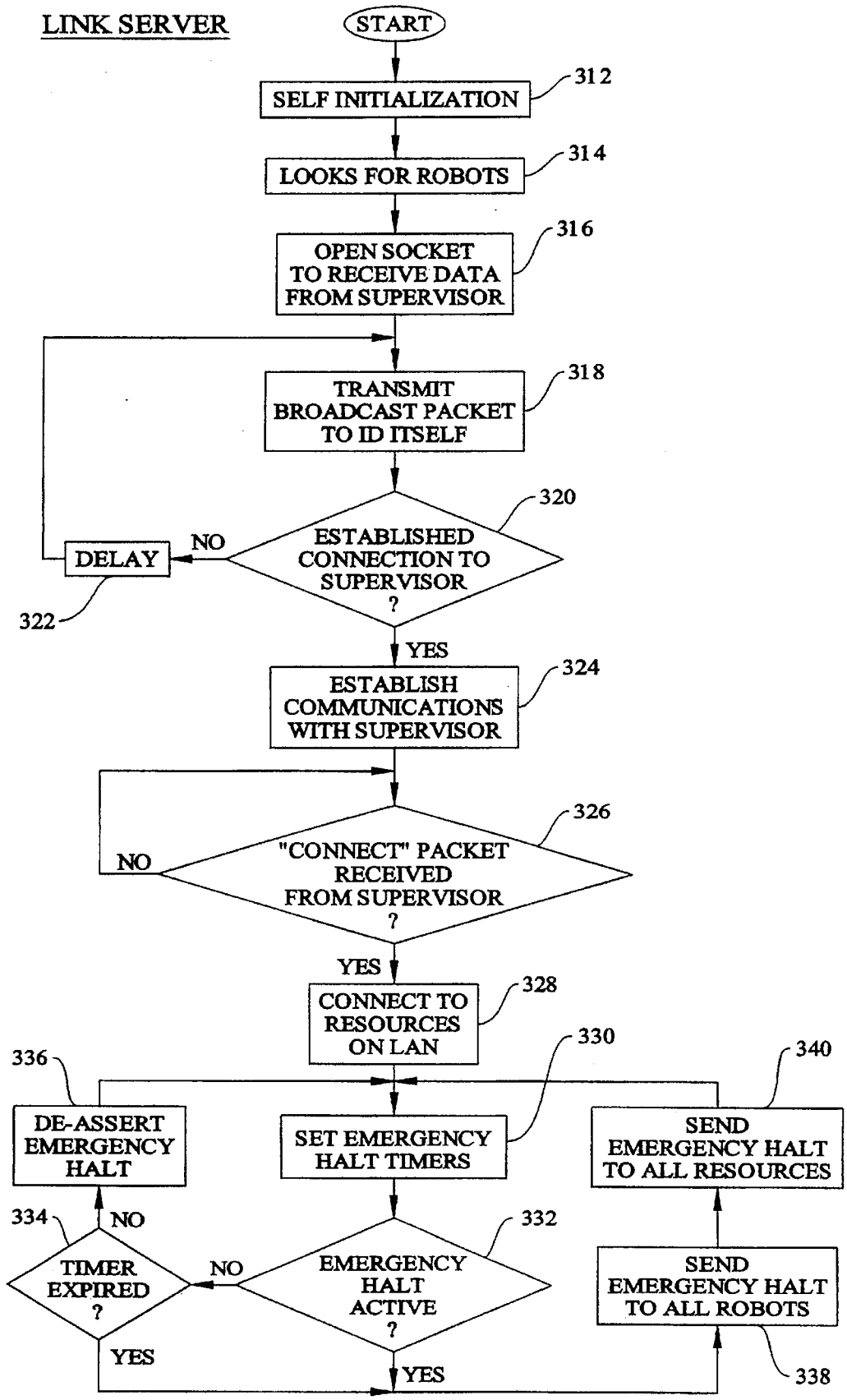
FIG. 3 is a flowchart showing the operation of the link server of FIG. 1.

The operation of the link server 18 is described with reference to the flow chart presented in FIG. 3. At step 312, the link 18 server performs a self-initialization. At step 314, the link server 18 looks for robots 19. Next, at step 316, the link server 18 opens a socket to receive data from the supervisor 12. At step 318, the link server 18 transmits a broadcast data packet to identify itself.

Proceeding to step 320, the link server 18 determines if a data connection has been established with the supervisor 12. If the determination is NO, the link server 18 waits for a predetermined time at step 322 and then returns to step 318. If, however, the determination at step 320 is YES, the link server 18 establishes communications with the supervisor 12 step 324.

Then at step 326, the link server 18 determines if a "connect data" packet has been received from the supervisor 12. If the determination at step 326 is NO, the link server 18 enters a loop and returns to step 326. The link server 18 remains in the loop, repeating step 326 until a "connect data"0 packet has been received from the supervisor 12, at which time the determination at step 326 will be YES. Then the link server 18 implements step 328 by establishing a data connection among itself and all resources on the local area network 20, including the supervisor 12, the planners 14, and the operators 16.

Next, at step 330, the link server 18 initiates two "halt" timers, a "running timer" which counts time $t_1$ and a "mark timer" which counts total elapsed time $t_2$. It is to be noted that time $t_1$ is reset at predetermined intervals during which there is no traffic on the LAN 20. At step 332, the link server 18 determines if it has received an emergency "HALT"0 input through a suitable input device 19 such as a keyboard, joystick, or mouse, or preferably through a conventional emergency halt switch, as shown in FIG. 1. If the determination at step 332 is NO, the link server 18 determines if the timer initiated at step 330 has expired by comparing $(t_1-t_2)$ and a constant K at step 334, where K represents a predetermined value, such as 5 seconds. If the result of the comparison at step 334 is that $(t_1-t_2)<K$, representing a logical NO, then at step 336, the link server initiates a "DE-ASSERT EMERGENCY HALT" message to all resources on the LAN 20. The purpose of the "DE-ASSERT EMERGENCY HALT" message is assure that the robots 19 are not inadvertently halted. The operation of the link server then returns to step 330. If, however, the determination at step 332 is YES, i.e., the link server 18 received an emergency "HALT" instruction, the link server issues an "EMERGENCY HALT" instruction to all robots 19. Then at step 340, the link server 18 notifies all resources on the LAN 20 that the "EMERGENCY HALT" instruction was issued. The operation of the link server 18 then returns to step 330. On the other hand, if the result of the comparison at step 334 YES, that is $(t_1-t_2) \geq K$, the link server continues to step 338, described above.

Figure 4:
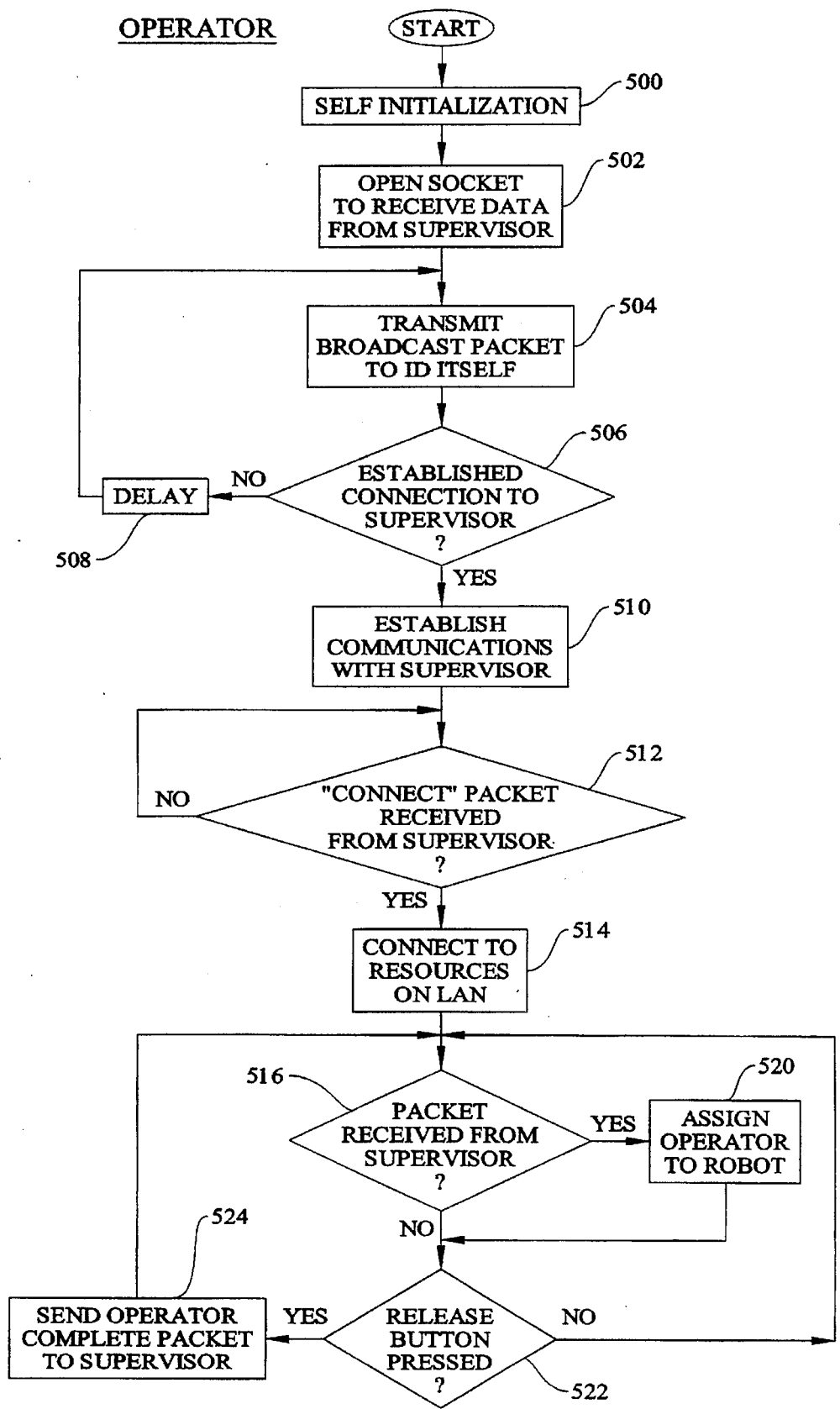
FIG. 4 is a flowchart illustrating the operation of the operator shown in FIG. 1.
Figure 5:
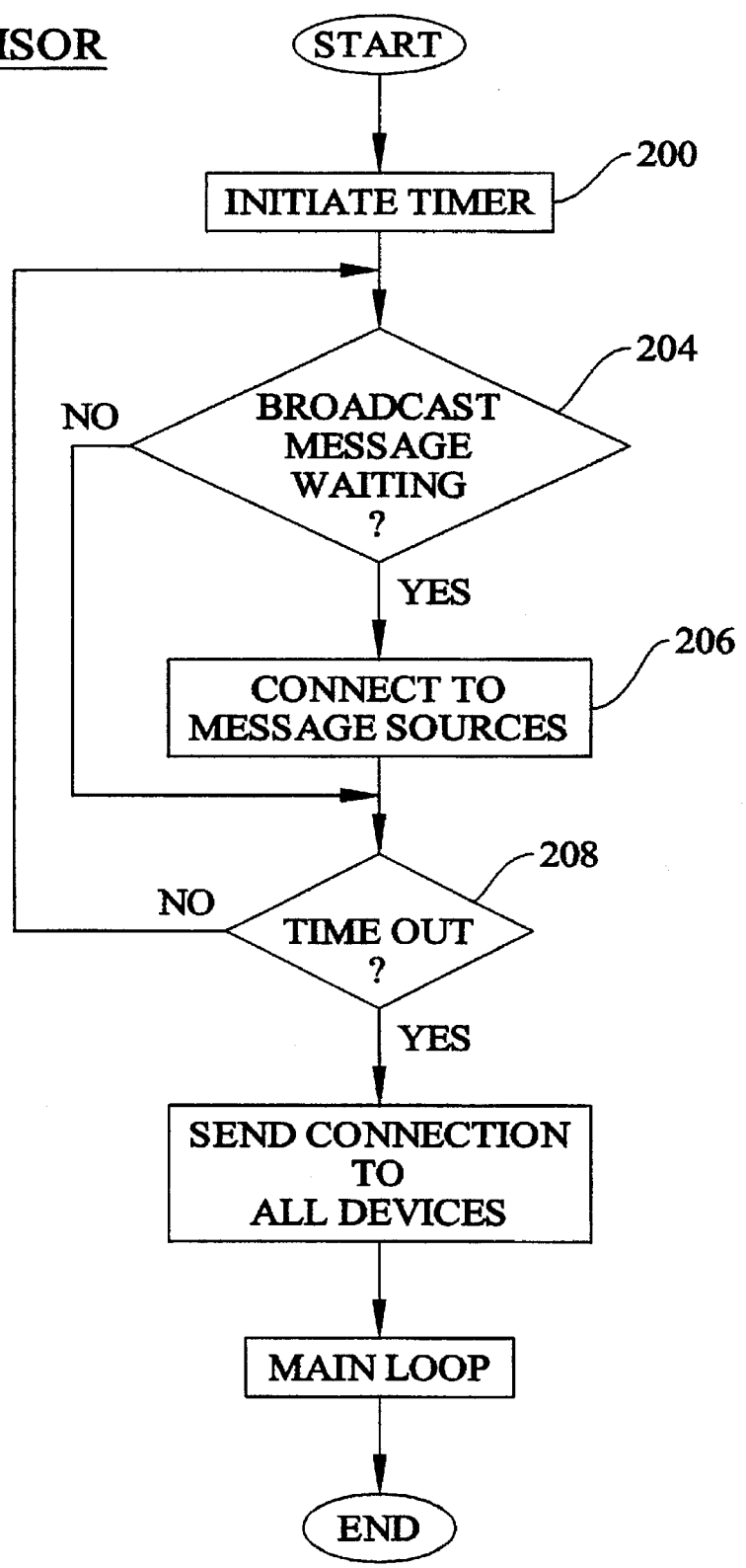
FIGS. 5–11, 12A, 12B, 13, 14A, 14B, and 15 are flowcharts showing the operation of the supervisor shown in FIG. 1.
Figure 6:
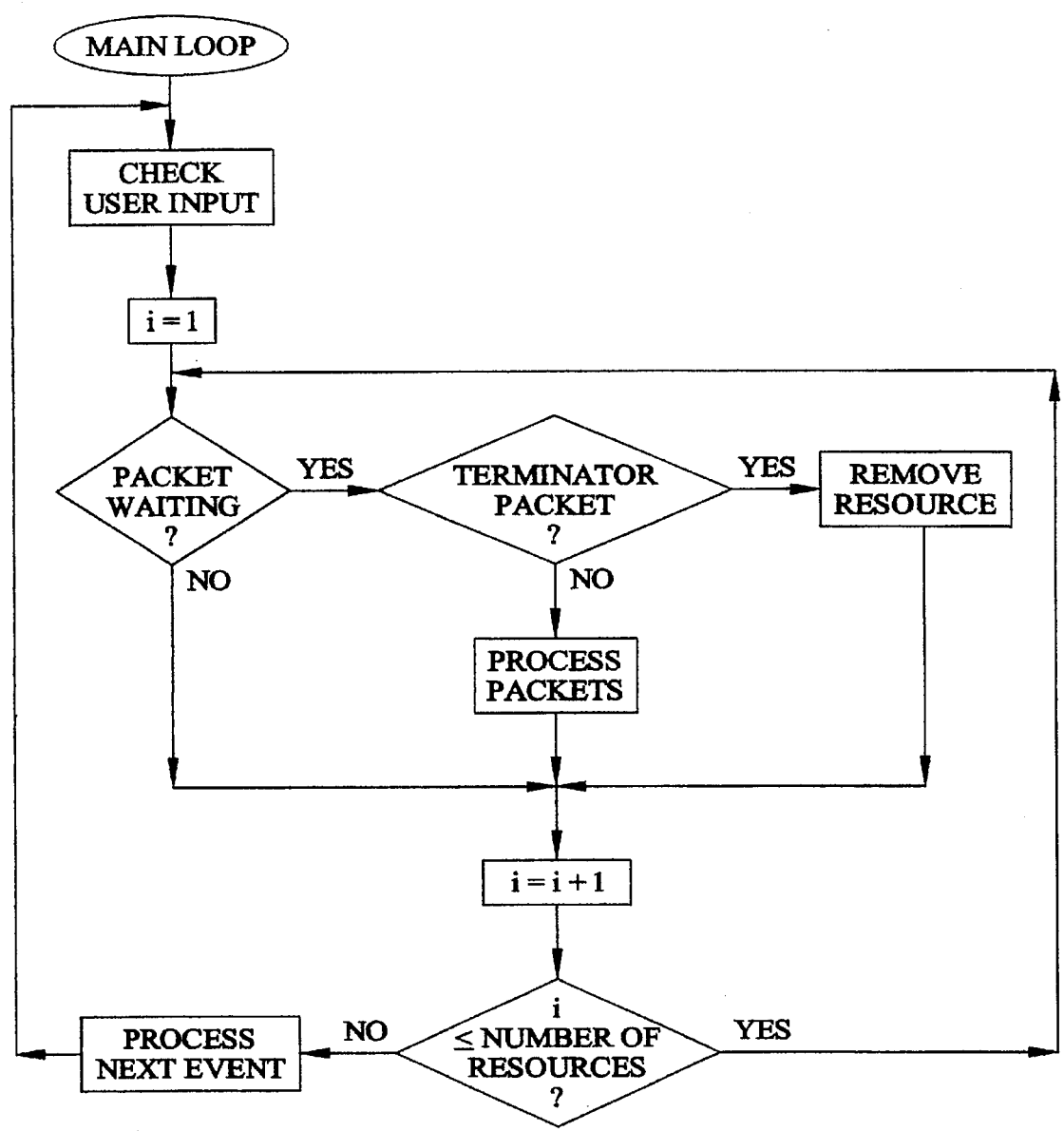
Figure 7:
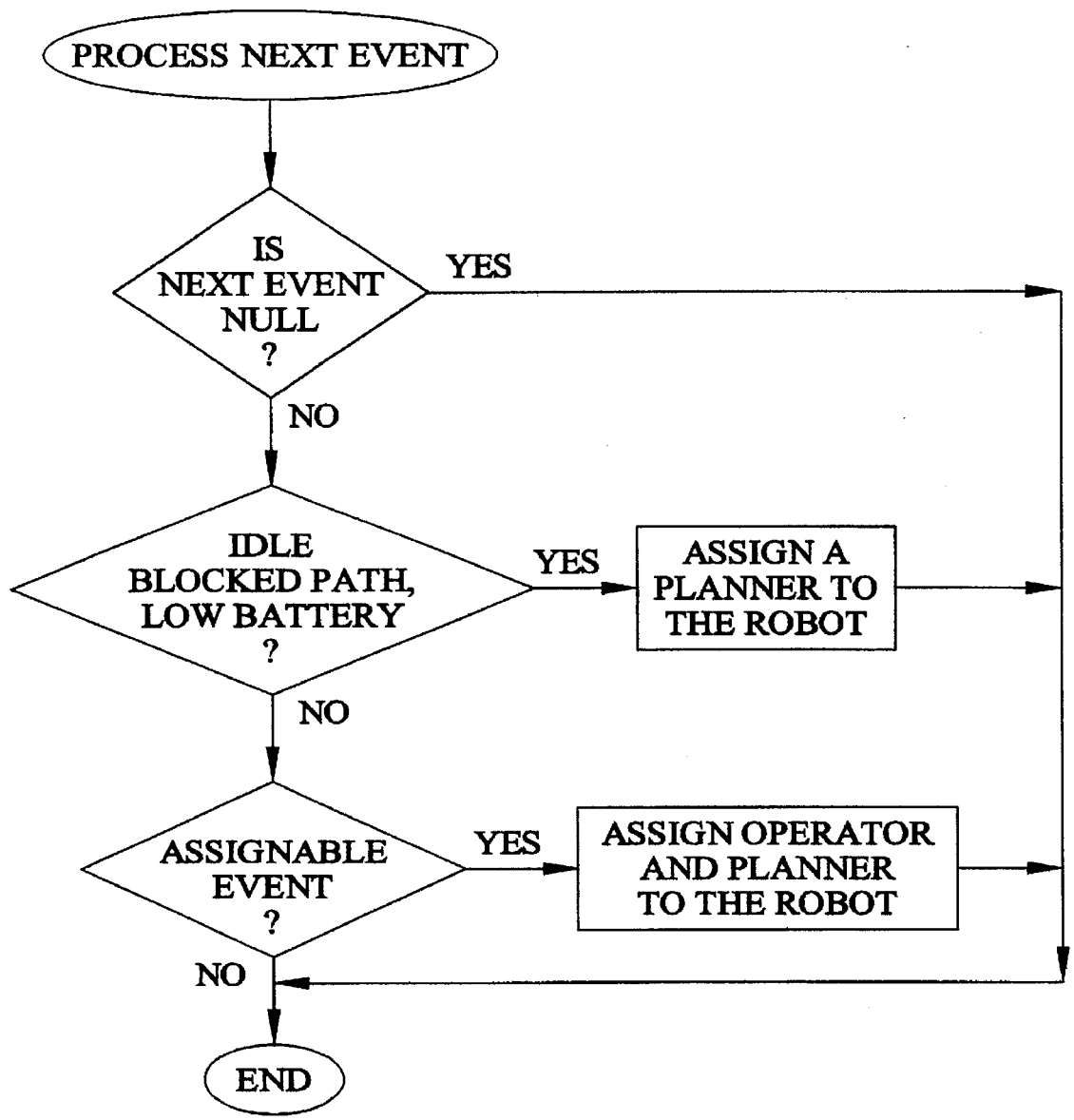
Figure 8:
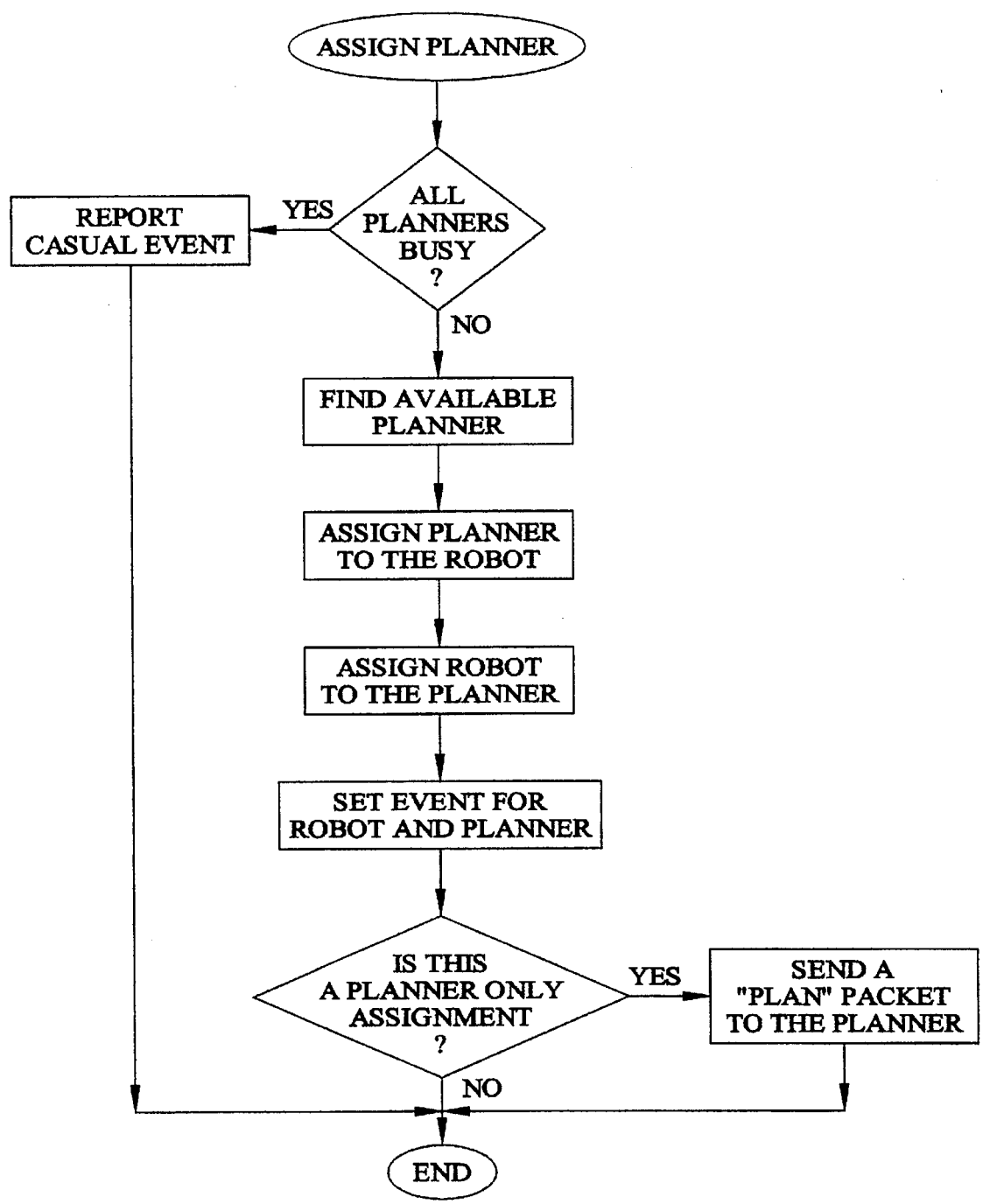
Figure 9:
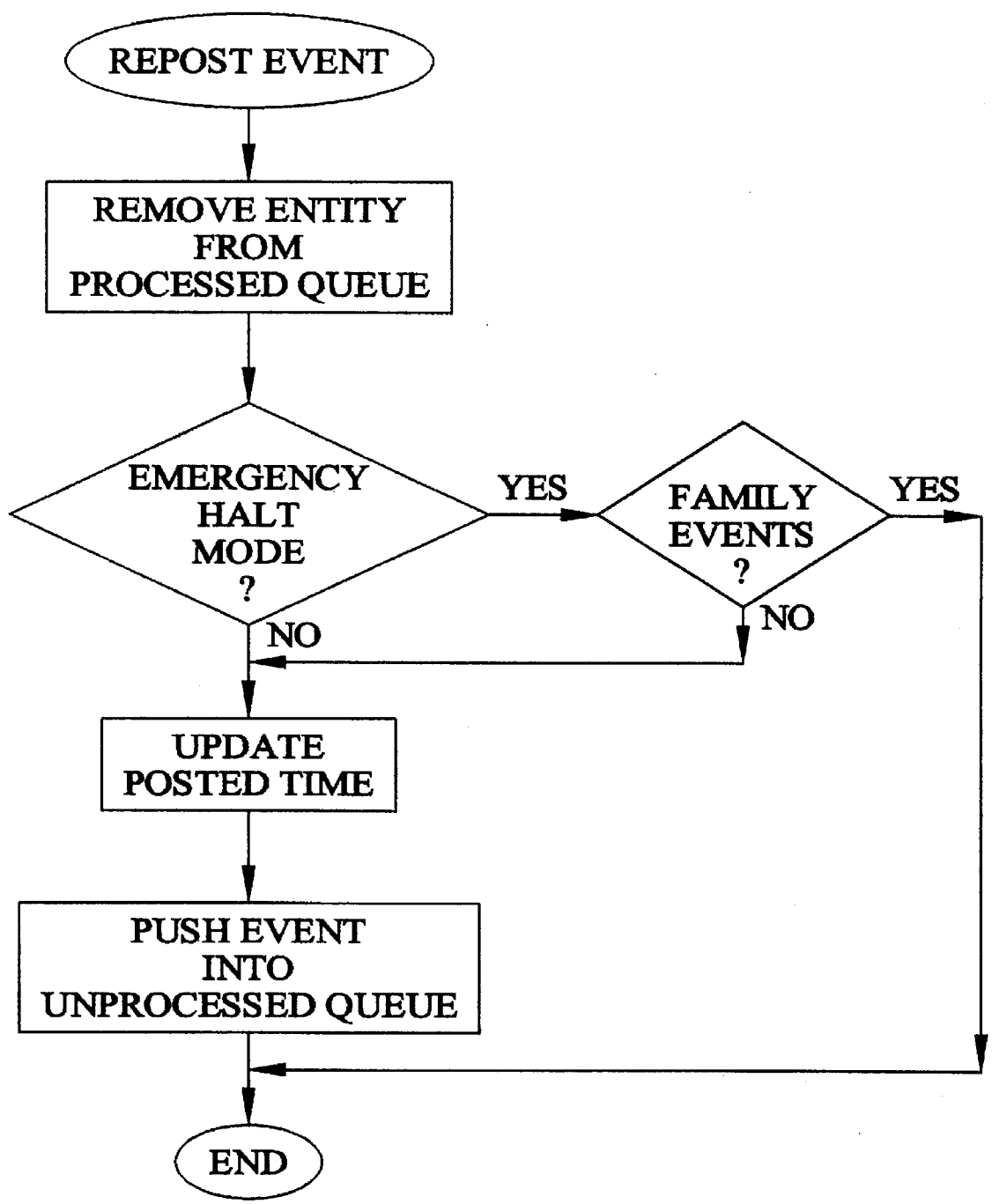
Figure 10:
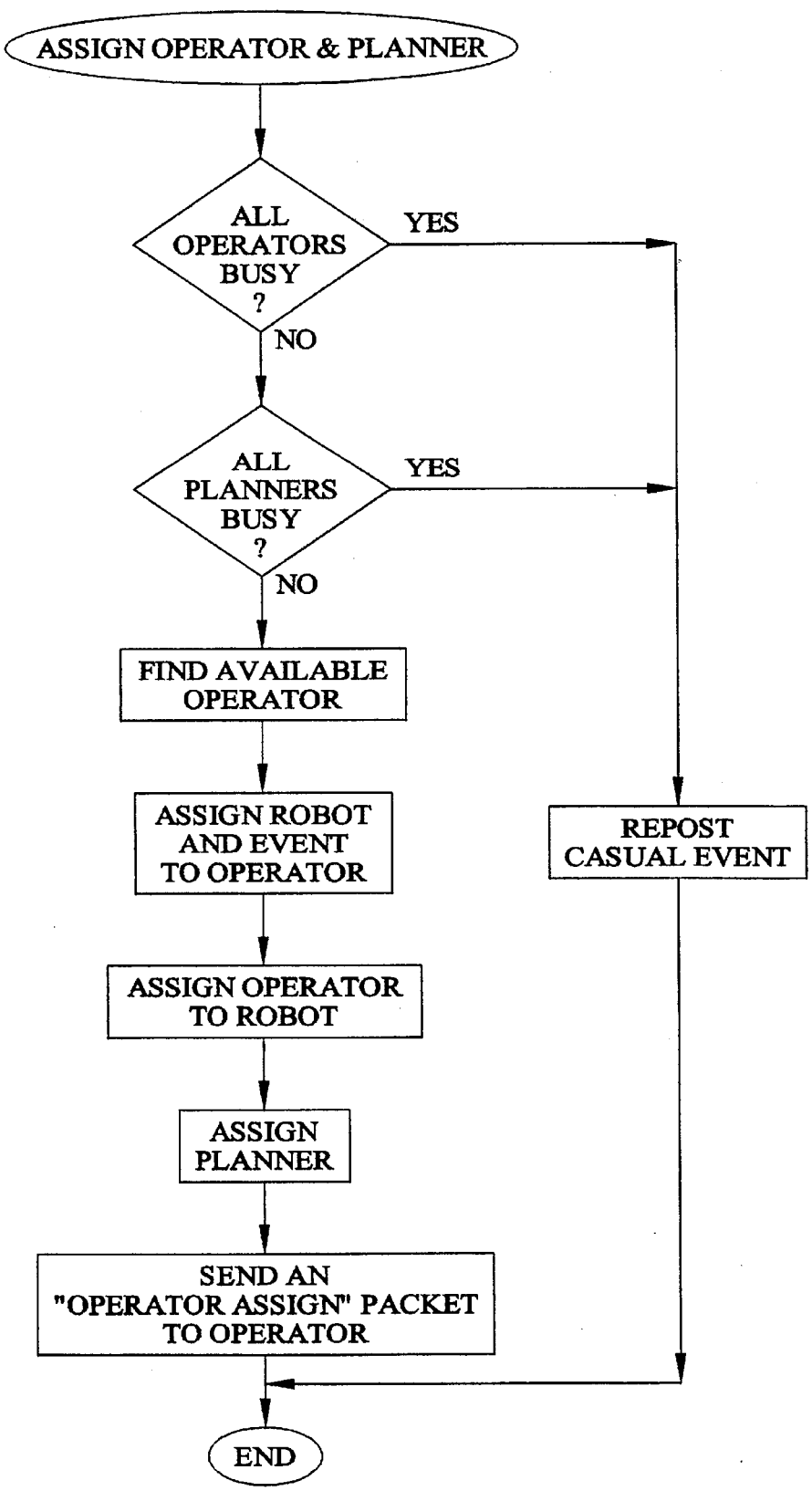
Figure 11:
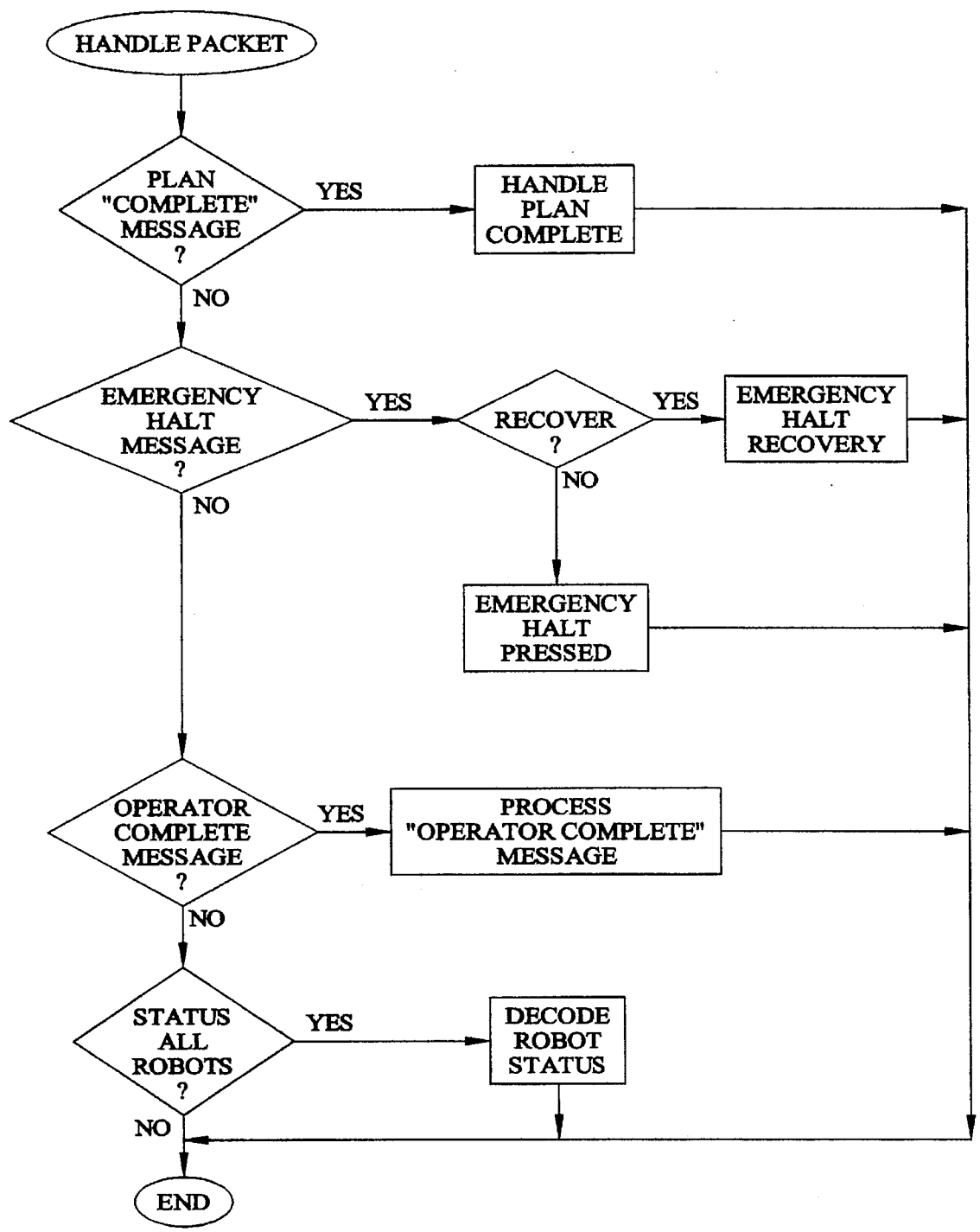
Figures 12, 12A, 12B:
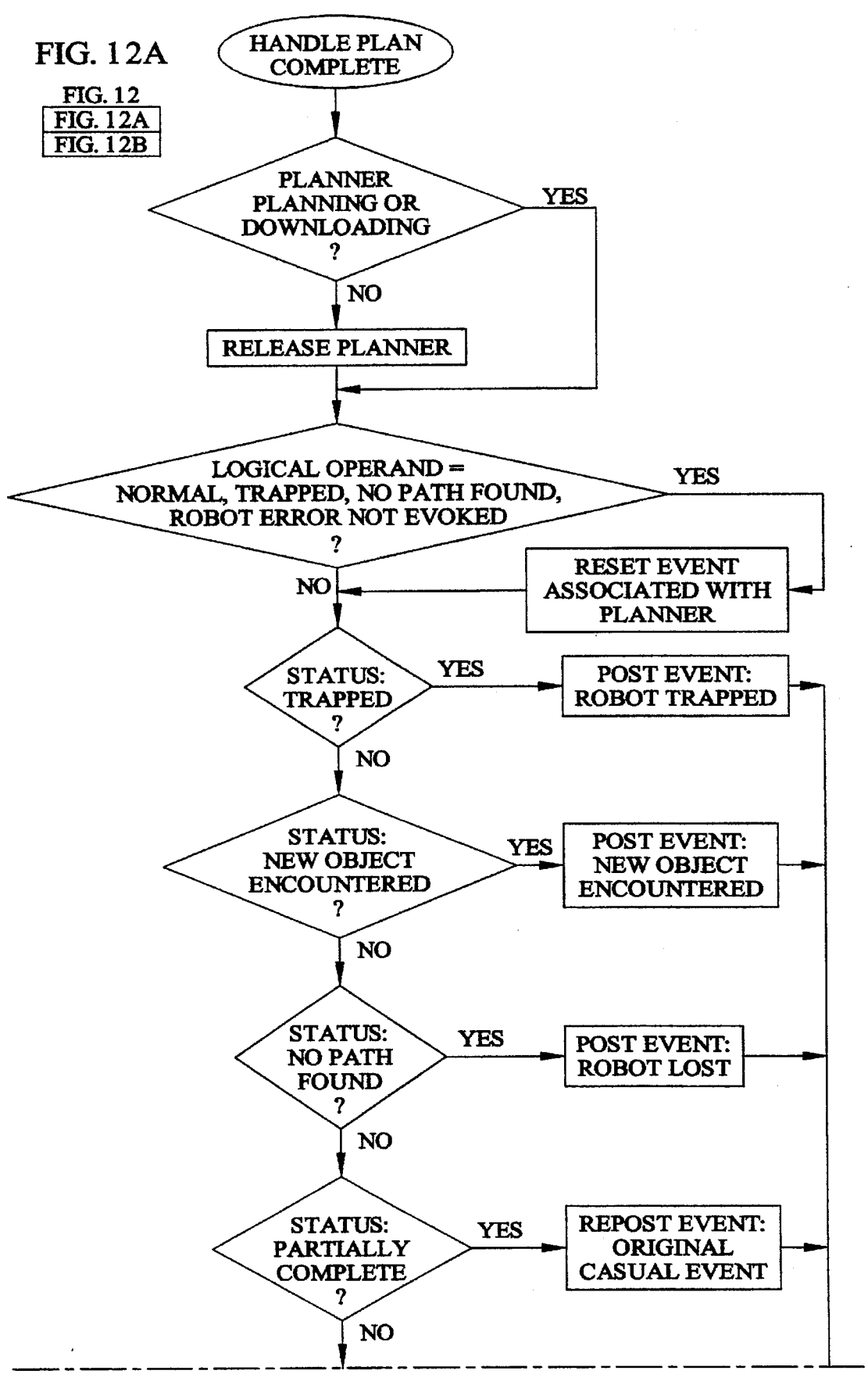
Figure 12B:
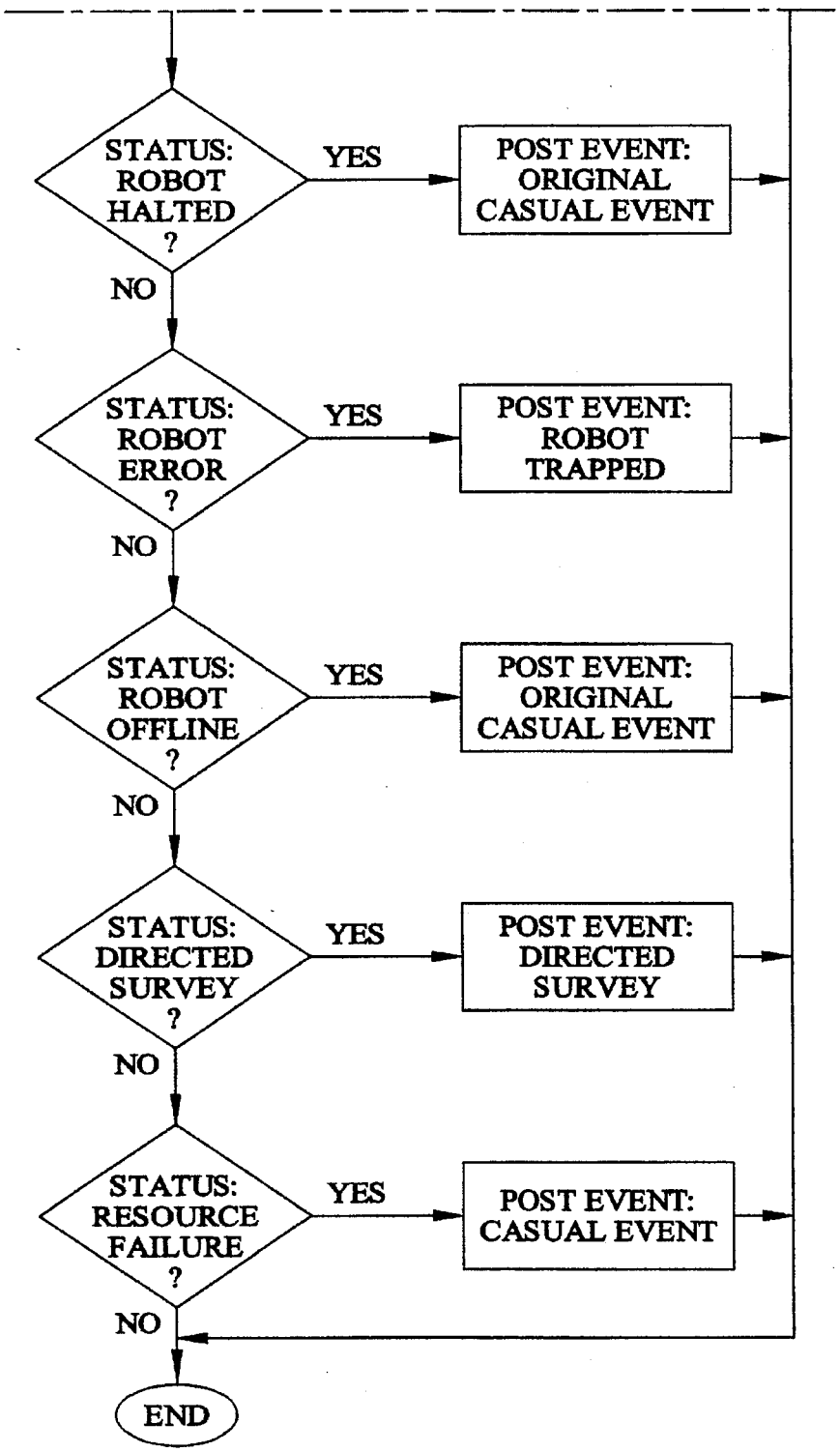
Figure 13:
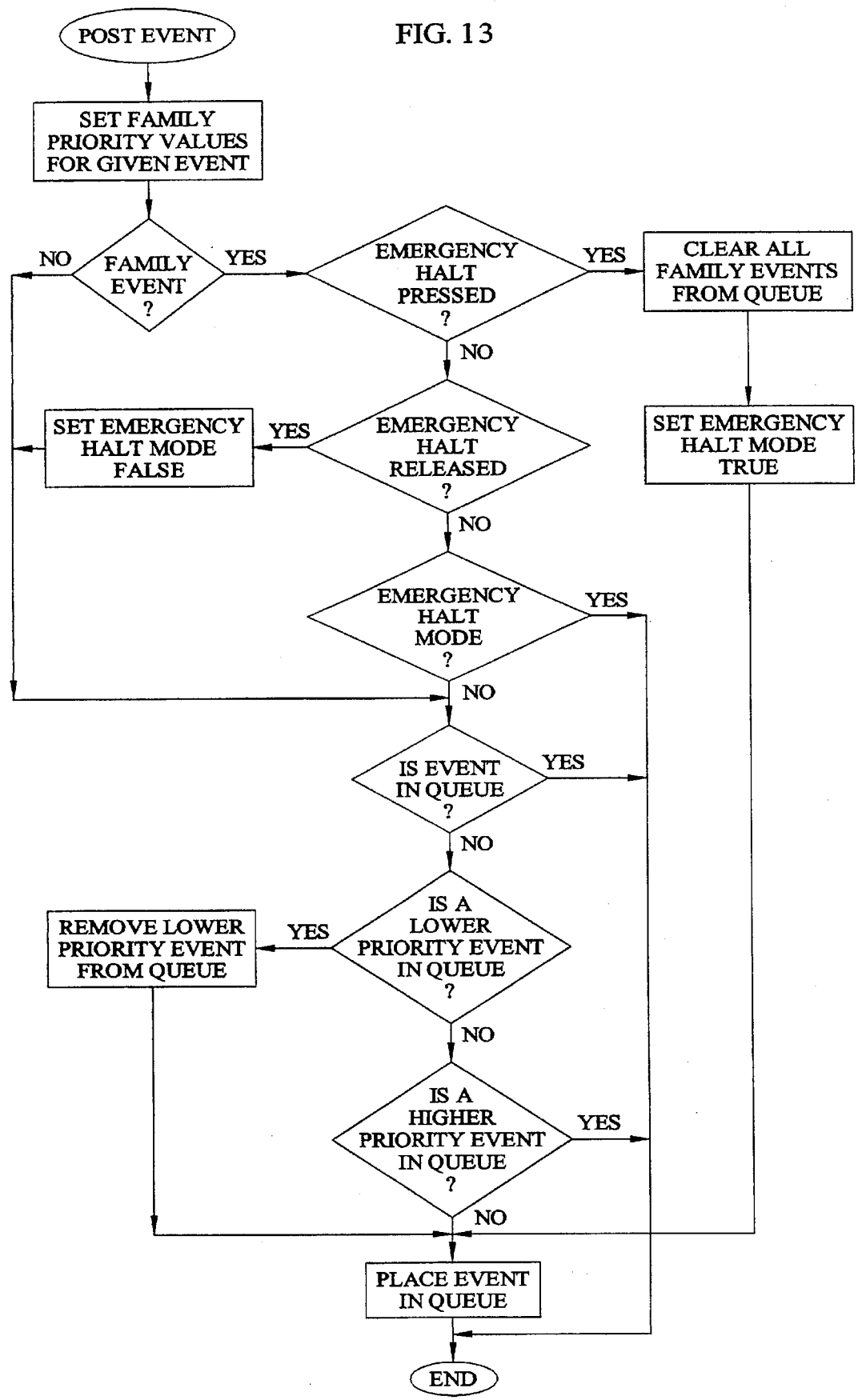
Figure 14A:
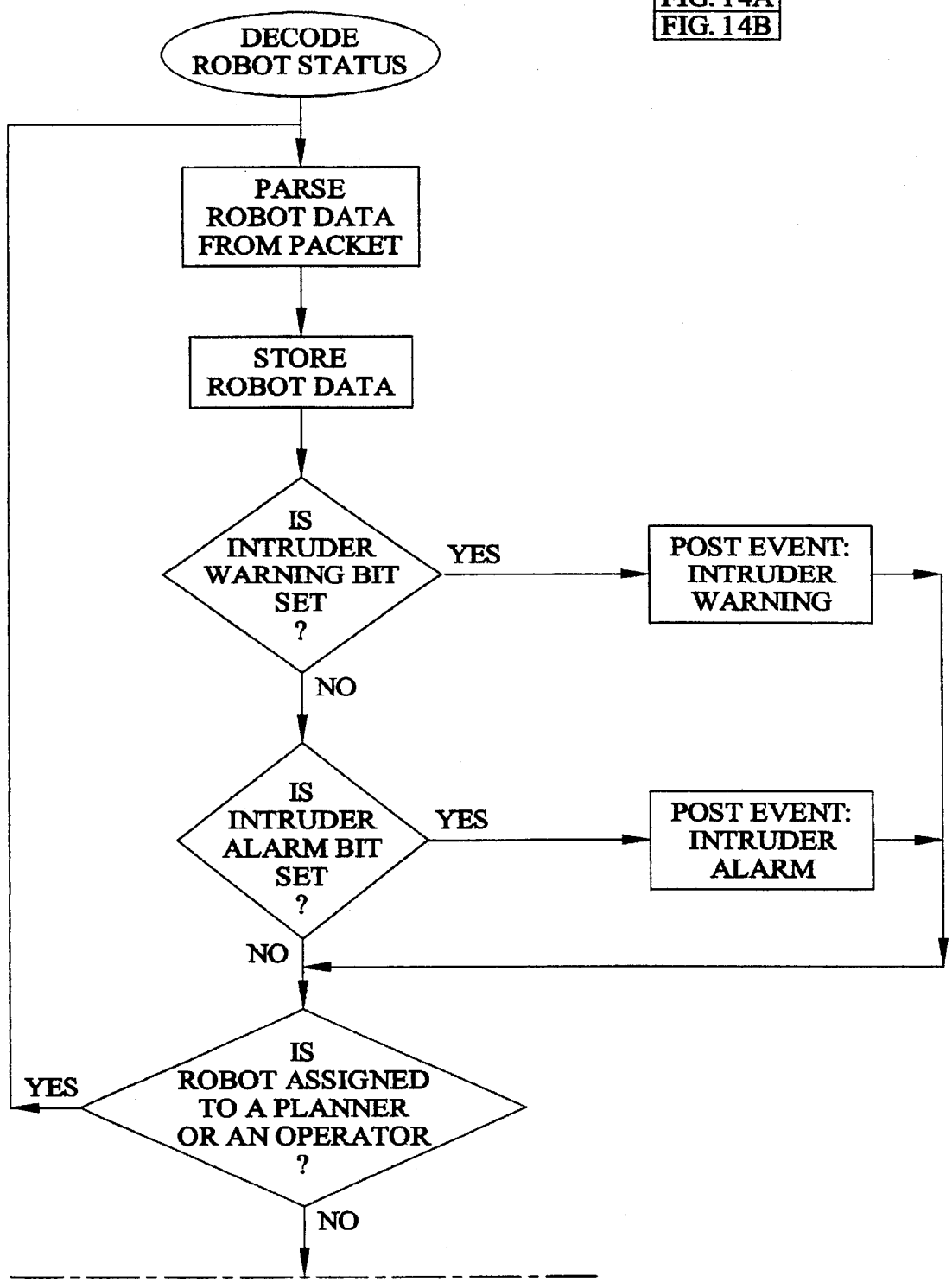
Figure 14B:
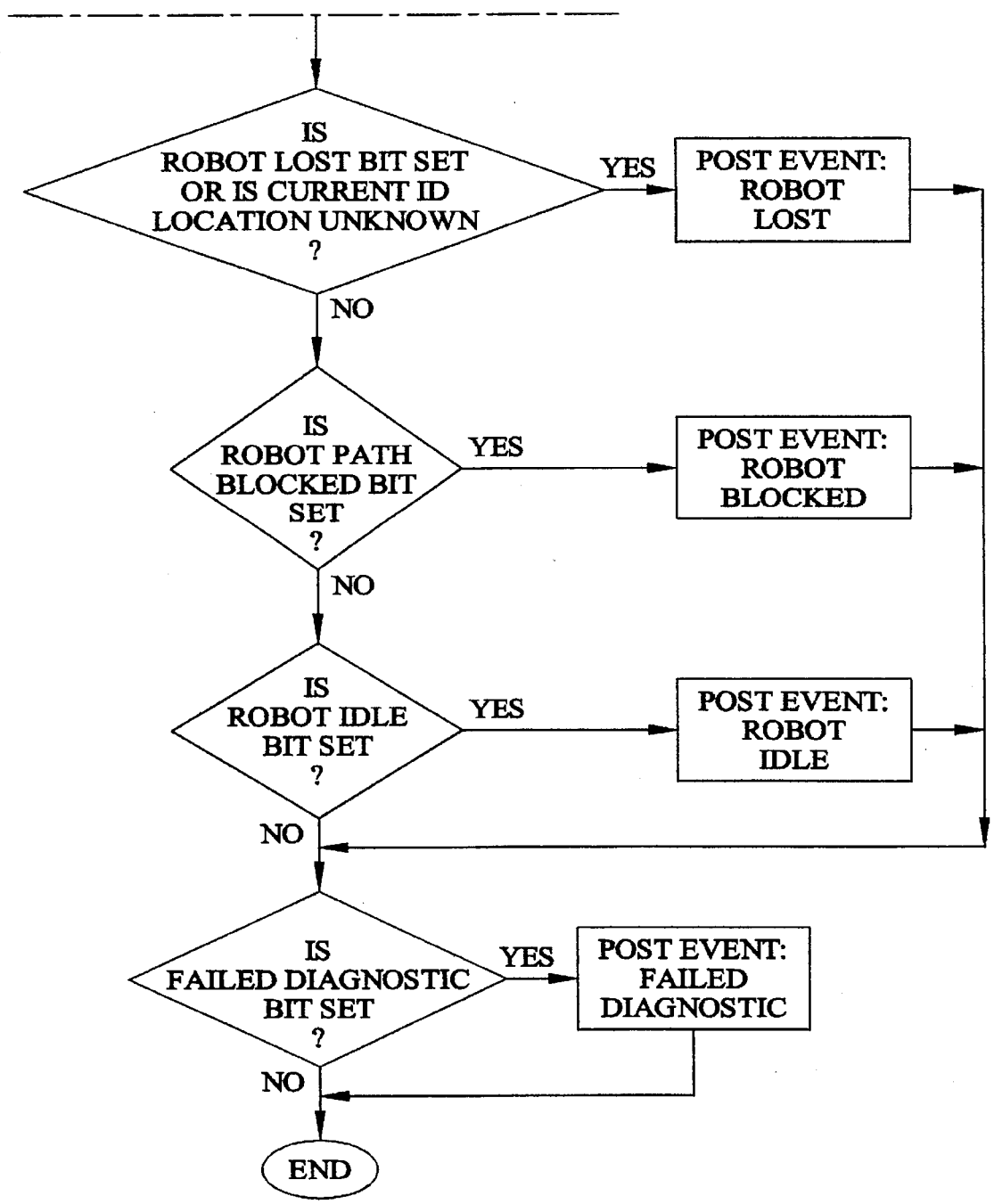
Figure 15:
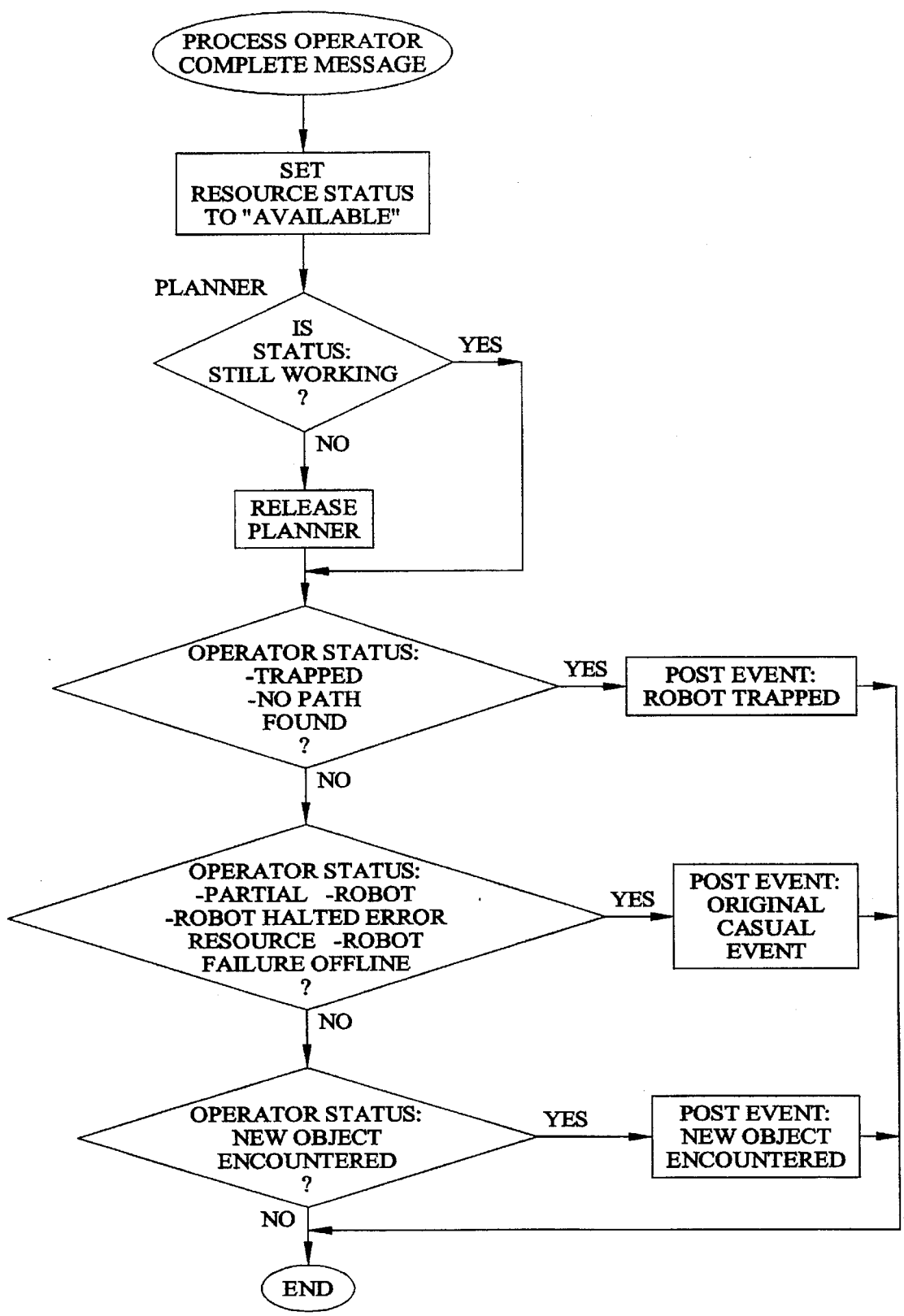

The operation of an operator station 16 is described with reference to FIG. 4. An operator 16 initializes itself at step 500. At step 502, the operator 16 opens a socket to receive data from the supervisor 12. At step 504, the operator 16 transmits a broadcast data packet to identify itself to all resources connected to the local area network 20. Next, the operator 16 determines if it has established a communications link with the supervisor 12 at step 506. If the determination at step 506 is NO, a delay is implemented, which may be on the order of five seconds. Then the operator 16 returns to step 504. If, however, the determination at step 506 is YES, the operator 16 establishes communications with the supervisor 12 at step 510.

The operator 16 then determines if a "connect" data packet has been received from the supervisor 12. If the determination at step 512 is NO, the operator 16 loops back continuously to step 512 until a "connect data" packet is received from the supervisor 12. The operator 16 establishes a data connection of itself to all resources on the local area network 20 at step 514.

At step 516, the operator 16 determines if a data packet has been received from the supervisor 12. If the determination at step 516 is NO, then at step 522, the operator 16 determines if a RELEASE input has been received from a guard (a human) by the operator 16. If the determination at step 522 is NO, the operation of the operator 16 returns to step 516. If at step 516, the operator determines that it has received a data packet from the supervisor 12, i.e. the determination at step 516 is YES, an operator 16 is assigned to a robot 19 at step 520. The operation of the operator then continues at step 522. If the determination at step 522 is YES, meaning the operator 16 has received a RELEASE input via an input to the operator 18, then at step 524 an OPERATOR COMPLETE DATA PACKET is sent via the LAN 20 to the supervisor 12.

Obviously, many modifications and variations of the present invention are possible in light of the above teachings. It is therefore to be understood that within the scope of the appended claims, the invention may be practiced otherwise than as specifically described.

We claim:

1. A system for assigning computer resources to control multiple computer directed devices, comprising:
 a p number of autonomous guided vehicles for generating status signals, where p is a positive number;
 a link server system for propagating said status signals in response to receiving a query signal;
 a supervisor computer for generating assignment signals in response to receiving said status signals from said link server and for generating said query signals;
 an m number of planner computers communicatively connected to said supervisor computer and to said autonomous guided Vehicles through said link server system whereby one of said planner computers is selected by said supervisor computer to generate vehicle control signals for directing the operation of a selected one of said autonomous guided vehicles in response to receiving said assignment signals, where m is a positive integer, and p≧m; and
 a local area network operably coupled to provide data communications between said supervisor computer, planner computers, and link server system.

2. The system of claim 1 in which said selected planner computer directs the mobility of said selected autonomous guided vehicle.

3. The system of claim 1 wherein said selected planner computer directs the operation of said selected autonomous guided vehicle if said status signals generated by said selected autonomous vehicle represent an obstacle blocking a path of said selected autonomous guided vehicle.

4. The system of claim 1 wherein said selected planner computer directs the operation of said selected autonomous guided vehicle if said status signals represent that said selected autonomous guided vehicle is lost.

5. The system of claim 1 wherein said selected planner computer directs the operation of said selected autonomous guided vehicle if said status signals represent that said selected autonomous guided vehicle has detected an intrusion in an environment.

6. The system of claim 1 wherein said selected planner computer directs the operation said selected autonomous guided vehicle if said status signals represent that said selected autonomous guided vehicle has a failed diagnostic.

7. A system for assigning computer resources to control multiple computer directed devices, comprising:
 a p number of autonomous guided vehicles for generating status signals, where p is a positive number;
 a link server system for propagating said status signals in response to receiving a query signal;
 a supervisor computer for generating assignment signals in response to receiving said status signals from said link server and for generating said query signals;
 an m number of planner computers communicatively connected to said supervisor computer and to said autonomous guided vehicles through said link server system whereby one of said planner computers is selected in response to receiving said assignment signals from said supervisor computer to generate path control signals which direct the mobility of a selected one of said autonomous guided vehicles, where m is a positive integer, and p≧m;
 an n number of operator computers communicatively connected to said supervisor computer and to said autonomous guided vehicles through said link server system whereby one of said operator computers is selected in response to receiving said assignment signals from said supervisor computer to transform manual inputs from a human operator into operator computer generated vehicle control signals for directing the operation of said selected autonomous guided vehicles, where n is a positive integer, and m>n; and
 a local area network operably coupled to provide data communications between said supervisor computer, planner computers, operator computers, and link server system.

8. The system of claim 7 wherein said planner computers and said operator computers are selected in accordance with rules implemented by said supervisor computer.

9. The system of claim 8 wherein one of said planner computers and one of said operator computers are selected according to said rules to control said selected autonomous guided vehicle if a path of said selected autonomous guided vehicle is blocked by a previously undetected obstacle.

10. The system of claim 8 wherein one of said planner computers is selected according to said rules to control said selected autonomous guided vehicle if a path of said selected autonomous guided vehicle is blocked by a previously detected obstacle.

11. The system of claim 8 wherein one of said operator computers are selected according to said rules to control said selected autonomous guided vehicle if a path determined by one of said planner computers is blocked by an obstacle.

12. The system of claim 8 wherein one of said planner computers and one of said operator computers are selected according to said rules to control said selected autonomous guided vehicle if said selected autonomous guided vehicle is lost.

13. The system of claim 8 wherein one of said planner computers and one of said operator computers are selected to control said selected autonomous guided vehicle if said selected autonomous guided vehicle detects a potential intrusion in an environment.

14. The system of claim 8 wherein one of said planner computers and one of said operator computers are selected to control said selected autonomous guided vehicle if said selected autonomous guided vehicle reports a failed diagnostic via said status signals.

* * * * *